(12) United States Patent
Wu et al.

(10) Patent No.: US 11,881,205 B2
(45) Date of Patent: Jan. 23, 2024

(54) SPEECH SYNTHESIS METHOD, DEVICE AND COMPUTER READABLE STORAGE MEDIUM

(71) Applicants: BEIJING JINGDONG SHANGKE INFORMATION TECHNOLOGY CO, LTD., Beijing (CN); BEIJING JINGDONG CENTURY TRADING CO., LTD., Beijing (CN)

(72) Inventors: Zhizheng Wu, Beijing (CN); Zhengchen Zhang, Beijing (CN); Wei Song, Beijing (CN); Yonghui Rao, Beijing (CN); Zhihang Xie, Beijing (CN); Guanghui Xu, Beijing (CN); Shuyong Liu, Beijing (CN); Bosen Ma, Beijing (CN); Shuangwen Qiu, Beijing (CN); Junmin Lin, Beijing (CN)

(73) Assignees: BEIJING JINGDONG SHANGKE INFORMATION TECHNOLOGY CO, LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 17/600,850

(22) PCT Filed: Mar. 30, 2020

(86) PCT No.: PCT/CN2020/082172
§ 371 (c)(1),
(2) Date: Oct. 1, 2021

(87) PCT Pub. No.: WO2020/200178
PCT Pub. Date: Oct. 8, 2020

(65) Prior Publication Data
US 2022/0165249 A1    May 26, 2022

(30) Foreign Application Priority Data

Apr. 3, 2019    (CN) .......................... 201910266289.4

(51) Int. Cl.
*G10L 13/08* (2013.01)
*G10L 13/02* (2013.01)
(Continued)

(52) U.S. Cl.
CPC .............. *G10L 13/02* (2013.01); *G10L 19/16* (2013.01); *G10L 25/30* (2013.01)

(58) Field of Classification Search
CPC ....... G10L 19/16; G10L 13/086; G10L 13/02; G10L 19/00; G10L 13/06; G10L 13/08;
(Continued)

(56) References Cited

U.S. PATENT DOCUMENTS 6,067,520 A    5/2000    Lee
9,484,014 B1   11/2016   Kaszczuk et al.
(Continued)

FOREIGN PATENT DOCUMENTS

CN    1540625 A    10/2004
CN    106297764 A    1/2017
(Continued)

OTHER PUBLICATIONS

Dou et al, "Hierarchical rnns for waveform-level speech synthesis", Dec. 2018, In2018 IEEE Spoken Language Technology Workshop (SLT) Dec. 18, 2018 (pp. 618-625). IEEE.*
(Continued)

*Primary Examiner* — Olujimi A Adesanya
(74) *Attorney, Agent, or Firm* — Myers Bigel, P.A.

(57) ABSTRACT

The present disclosure relates to a speech synthesis method and device, and a computer-readable storage medium, and relates to the field of computer technology. The method of
(Continued)

the present disclosure includes: dividing a text into a plurality of segments according to a language category to which each of the segments belongs; converting each of the segments into a phoneme corresponding to the segment to generate a phoneme sequence of the text according to the language category to which each of the segments belongs; inputting the phoneme sequence into a speech synthesis model trained in advance and converting the phoneme sequence into a vocoder characteristic parameter; and inputting the vocoder characteristic parameter into a vocoder to generate a speech.

20 Claims, 5 Drawing Sheets

(51) Int. Cl.
  *G10L 19/16* (2013.01)
  *G10L 25/30* (2013.01)
(58) Field of Classification Search
  CPC ....... G10L 13/047; G10L 13/07; G10L 13/10; G06F 40/263
  See application file for complete search history.

(56) References Cited

U.S. PATENT DOCUMENTS

| | | | |
|---|---|---|---|
| 9,799,327 B1 | 10/2017 | Chan et al. | |
| 2004/0193398 A1* | 9/2004 | Chu | G10L 13/08 704/E13.011 |
| 2005/0267757 A1* | 12/2005 | Iso-Sipila | G10L 13/08 704/E15.02 |
| 2006/0136216 A1* | 6/2006 | Shen | G10L 13/08 704/266 |
| 2007/0106513 A1* | 5/2007 | Boillot | G10L 19/00 704/260 |
| 2008/0040095 A1* | 2/2008 | Sinha | G06F 40/45 704/E15.001 |
| 2011/0184718 A1* | 7/2011 | Chen | G06F 40/55 704/9 |
| 2012/0072204 A1* | 3/2012 | Nasri | G06F 40/253 704/260 |
| 2012/0278081 A1 | 11/2012 | Chun et al. | |
| 2013/0238339 A1 | 9/2013 | Fleizach et al. | |
| 2015/0186359 A1 | 7/2015 | Fructuoso et al. | |
| 2017/0047060 A1* | 2/2017 | Liu | G10L 13/10 |
| 2017/0092258 A1* | 3/2017 | Edrenkin | G10L 13/08 |
| 2018/0247636 A1* | 8/2018 | Arik | G10L 13/08 |
| 2019/0122651 A1* | 4/2019 | Arik | G10L 13/08 |
| 2019/0164535 A1 | 5/2019 | Zhou | |
| 2019/0172444 A1* | 6/2019 | Hiroe | G10L 15/10 |

FOREIGN PATENT DOCUMENTS

| | | |
|---|---|---|
| CN | 107945786 A | 4/2018 |
| JP | 2004287444 A | 10/2004 |
| TW | 201705019 A | 2/2017 |

OTHER PUBLICATIONS

Mimura et al, "Leveraging sequence-to-sequence speech synthesis for enhancing acoustic-to-word speech recognition", Dec. 2018, In2018 IEEE Spoken Language Technology Workshop (SLT) Dec. 18, 2018 (pp. 477-484). IEEE.*
Shen et al, "Natural tts synthesis by conditioning wavenet on mel spectrogram predictions", Apr. 2018, In2018 IEEE international conference on acoustics, speech and signal processing (ICASSP) Apr. 15, 2018 (pp. 4779-4783). IEEE.*
Li, Bo , et al., Bytes Are All You Need: End-to-End Multilingual Speech Recognition and Synthesis With Bytes.
Nachmani, Eliya , et al., "Unsupervised Polyglot Text-to-Speech", arXiv:1902.02263v1 [cs.LG] Feb. 6, 2019, 5 pages.
Xue, Liumeng , et al., "Building a mixed-lingual neural TTS system with only monolingual data", arXiv:1811.09021v1 [eess.AS] Nov. 22, 2018, 6 pages.
Communication pursuant to Rule 164(1) EPC, EP Application No. 20783784.0, dated Oct. 18, 2022, 14 pp.
"Communication with Supplementary European Search Report", EP Application No. 20783784.0, dated Apr. 13, 2023, 14 pp.
Ping, Wei , et al., "Deep Voice 3: 2000—Speaker Neural Text-to-Speech", arXiv:1710.07654v1 [cs.SD]; retrieved from https://arxiv.org/abs/1710.07654v1, Oct. 20, 2017, 15 pp.
Ping, Wei , et al., "Deep Voice 3: Scaling Text-to-Speech With Convolutional Sequence Learning", arXiv:1710.07654v3 [cs.SD]; retrieved from https://arxiv.org/abs/1710.07654v3, Feb. 22, 2018, 16 pp.
Wang, Yuxuan , et al., "Tacotron: A Fully End-to-End Text-to-Speech Synthesis Model", arXiv:1703.10135v1 [cs.CL], retrieved from https://arxiv.org/abs/1703.10135, Mar. 29, 2017, 10 pp.
"Notice of First Examination Opinion", CN Application No. 201910266289.4, dated Nov. 23, 2023, 10 pp.
"Notice of Reasons for Rejection and English language translation", JP Application No. 2021-558871, dated Oct. 10, 2023, 10 pp.
Sotelo, Jose , et al., "Char2Wav: End-to-End Speech Synthesis", International Conference on Learning Representations, Toulon, France, Apr. 24, 2017, 6 pp.

* cited by examiner

```
┌─────────────────────────────────────────────────────┐
│ The speech samples corresponding to each training   │
│ text are divided into different frames according to │
│ the preset frequency, and the acoustic characteristic│──── S302
│ parameters are extracted for each frame, so as to   │
│ respectively generate the first acoustic            │
│ characteristic parameter samples corresponding to   │
│ each training text.                                 │
└─────────────────────────────────────────────────────┘
                          │
┌─────────────────────────────────────────────────────┐
│ The acoustic parameter prediction model is trained by│
│ using each training text and the first acoustic     │──── S304
│ characteristic parameter sample corresponding to each│
│ training text.                                      │
└─────────────────────────────────────────────────────┘
                          │
┌─────────────────────────────────────────────────────┐
│ Each training text is converted into a second       │
│ acoustic characteristic parameter sample respectively│──── S306
│ by using the trained acoustic parameter prediction  │
│ model.                                              │
└─────────────────────────────────────────────────────┘
                          │
┌─────────────────────────────────────────────────────┐
│ Based on the synthesis frequency of the vocoder, the│
│ speech samples corresponding to each training text  │──── S308
│ are respectively converted into the characteristic  │
│ parameter samples of the vocoder.                   │
└─────────────────────────────────────────────────────┘
                          │
┌─────────────────────────────────────────────────────┐
│ The vocoder parameter conversion model is trained by│
│ using the second acoustic characteristic parameter  │──── S310
│ sample and the vocoder characteristic parameter     │
│ sample corresponding to each training text.         │
└─────────────────────────────────────────────────────┘
```

Fig. 3

SPEECH SYNTHESIS METHOD, DEVICE AND COMPUTER READABLE STORAGE MEDIUM

CROSS-REFERENCE TO RELATED APPLICATIONS

This is a U.S. National Stage Application under 35 U.S.C. § 371 of International Patent Application No. PCT/CN2020/082172, filed on Mar. 30, 2020, which application is based on and claims the benefit of priority to the Chinese patent application No. 201910266289.4 filed on Apr. 3, 2019, the disclosure of both of which are hereby incorporated by reference in its entirety into the present application.

TECHNICAL FIELD

The present disclosure relates to the field of computer technology, and in particular to a speech synthesis method and device, and a computer-readable storage medium.

BACKGROUND

The speech synthesis system which is capable of realizing conversion from text to speech (Text To Speech, TTS), may convert text into sound by a series of algorithmic operations, and implement the process of simulating human pronunciation by a machine.

The current speech synthesis system generally can only support unilingual pronunciation.

SUMMARY

The inventors have found that, the current speech synthesis system generally only supports Chinese or only English pronunciation, but cannot realize smooth multilingual pronunciation.

One technical problem to be solved by the present disclosure is: how to implement an end-to-end speech synthesis system that supports multilingual pronunciation.

According to some embodiments of the present disclosure, a speech synthesis method is provided. The method comprises the steps of: dividing a text into a plurality of segments according to a language category to which each of the segments belongs; converting each of the segments into a phoneme corresponding to a segment to generate a phoneme sequence of the text, according to the language category to which each of the segments belongs; inputting the phoneme sequence into a speech synthesis model trained in advance and converting the phoneme sequence into a vocoder characteristic parameter; and inputting the vocoder characteristic parameter into a vocoder to generate a speech.

According to some embodiments, dividing the text into a plurality of segments according to the language category to which each of the segments belongs comprises: recognizing the language category to which each character belongs according to an encode of each character of the text; and dividing consecutive characters belonging to same language into one segment of the language.

According to some embodiments, generating a phoneme sequence of the text comprises: determining a prosodic structure of the text; and adding a prosodic identifier after the phoneme corresponding to each character of the text according to the prosodic structure of the text, to form the phoneme sequence of the text.

According to some embodiments, inputting the phoneme sequence into the speech synthesis model trained in advance and converting the phoneme sequence into the vocoder characteristic parameter comprises: inputting the phoneme sequence into an acoustic parameter prediction model of the speech synthesis model, to convert the phoneme sequence into an acoustic characteristic parameter; and inputting the acoustic characteristic parameter into a vocoder parameter conversion model of the speech synthesis model, to obtain the vocoder characteristic parameter.

According to some embodiments, the acoustic parameter prediction model comprises: an encoder, a decoder, and an attention model, and the inputting the phoneme sequence into the acoustic parameter prediction model of the speech synthesis model, to convert the phoneme sequence into the acoustic characteristic parameter comprises: determining an attention weight of each characteristic representation output by the encoder at a current moment by using the attention model; and determining whether the attention weight of a characteristic representation corresponding to a preset element in the phoneme sequence is a maximum value among attention weights, and if so, ending a decoding process of the decoder.

According to some embodiments, the acoustic characteristic parameter comprises a speech frequency spectrum parameter; and the vocoder parameter conversion model comprises a multi-layer deep neural network and a long-and-short-term memory network.

According to some embodiments, in the case that a frequency of the acoustic characteristic parameter is less than that of the vocoder characteristic parameter, making the frequency of the acoustic characteristic parameter equal to that of the vocoder characteristic parameter by up-sampling the acoustic characteristic parameter repeatedly.

According to some embodiments, the method further comprises training the speech synthesis model, wherein a training method comprises: dividing a speech sample corresponding to each of training texts into different frames according to a preset frequency, extracting an acoustic characteristic parameter for each frame, and generating a first acoustic characteristic parameter sample corresponding to each of the training texts respectively; training the acoustic parameter prediction model by using the first acoustic characteristic parameter sample corresponding to each of the training texts and each of the training texts; converting each of the training texts into a second acoustic characteristic parameter sample respectively by using a trained acoustic parameter prediction model; converting a speech sample corresponding to each of the training texts into a vocoder characteristic parameter sample respectively according to a synthesis frequency of the vocoder; and training a vocoder parameter conversion model by using the second acoustic characteristic parameter sample corresponding to each of the training texts and the vocoder characteristic parameter sample.

According to some embodiments, the acoustic parameter prediction model comprises: an encoder, a decoder, and an attention model, and the inputting the phoneme sequence into the acoustic parameter prediction model of the speech synthesis model, to convert the phoneme sequence into the acoustic characteristic parameter comprises: inputting the phoneme sequence to the encoder, and obtaining a characteristic representation corresponding to each element in the phoneme sequence output by the encoder; inputting a characteristic representation corresponding to each element, a hidden state of the decoder output at a current moment by a first recurrent layer in the decoder, and a cumulative information of an attention weight corresponding to each element at a previous moment into the attention model, to obtain a context vector; inputting a hidden state of the decoder output at the current moment by a first recurrent layer of the decoder and the context vector into a second recurrent layer of the decoder, to obtain a hidden state of the decoder output at the current moment by the second recurrent layer of the decoder; and predicting the acoustic characteristic parameter according to a hidden state of the decoder at each moment output by the decoder.

According to some embodiments, converting each of the segments into the corresponding phoneme respectively according to the language category to which each of the segments belongs comprises: performing text normalization to each of the segments respectively according to the language category to which each of the segments belongs; performing word group division on each normalized segment according to the language category to which each of the segments belongs; and converting a divided word group of each of the segments into a corresponding phoneme according to a preset phoneme conversion table of the language category to which each of the segments belongs; wherein the phoneme comprises a tone of a character.

According to other embodiments of the present disclosure, a speech synthesis device is provided. The device comprises: a language recognition module configured to divide a text into a plurality of segments according to a language category to which each of the segments belongs; a phoneme conversion module configured to convert each of the segments into a phoneme corresponding to the segment to generate a phoneme sequence of the text according to the language category to which each of the segments belongs; a parameter conversion module configured to input the phoneme sequence into a speech synthesis model trained in advance and converting the phoneme sequence into a vocoder characteristic parameter; and a speech generation module configured to input the vocoder characteristic parameter into a vocoder to generate a speech.

According to some embodiments, the language recognition module is configured to recognize the language category to which each character belongs according to the encode of each character of the text, and divide consecutive characters belonging to same language into one segment of the language.

According to some embodiments, the phoneme conversion module is configured to determine a prosodic structure of the text, and add a prosodic identifier after the phoneme corresponding to each character of the text according to the prosodic structure of the text, to form the phoneme sequence of the text.

According to some embodiments, the parameter conversion module is configured to input the phoneme sequence into an acoustic parameter prediction model of the speech synthesis model, to convert the phoneme sequence into an acoustic characteristic parameter, and input the acoustic characteristic parameter into a vocoder parameter conversion model of the speech synthesis model to obtain the vocoder characteristic parameter.

According to some embodiments, the acoustic parameter prediction model comprises: an encoder, a decoder, and an attention model, and the parameter conversion module is configured to determine an attention weight of each characteristic representation output by the encoder at a current moment by using the attention model, and determine whether the attention weight of a characteristic representation corresponding to a preset element in the phoneme sequence is a maximum value among attention weights, and if so, ending a decoding process of the decoder.

According to some embodiments, the acoustic characteristic parameter comprises a speech frequency spectrum parameter; and the vocoder parameter conversion model comprises a multi-layer deep neural network and a long-and-short-term memory network.

According to some embodiments, in the case that a frequency of the acoustic characteristic parameter is less than that of the vocoder characteristic parameter, making the frequency of the acoustic characteristic parameter equal to that of the vocoder characteristic parameter by up-sampling the acoustic characteristic parameter repeatedly.

According to some embodiments, a model training module configured to divide a speech sample corresponding to each of training texts into different frames according to a preset frequency, extracting an acoustic characteristic parameter for each frame, and generating a first acoustic characteristic parameter sample corresponding to each of the training texts respectively; train the acoustic parameter prediction model by using the first acoustic characteristic parameter sample corresponding to each of the training texts and each of the training texts; convert each of the training texts into a second acoustic characteristic parameter sample respectively by using a trained acoustic parameter prediction model; convert a speech sample corresponding to each of the training texts into a vocoder characteristic parameter sample respectively according to a synthesis frequency of the vocoder; and train a vocoder parameter conversion model by using the second acoustic characteristic parameter sample corresponding to each of the training texts and the vocoder characteristic parameter sample.

According to some embodiments, the acoustic parameter prediction model comprises: an encoder, a decoder, and an attention model, and the parameter conversion module is configured to input the phoneme sequence to the encoder, and obtaining a characteristic representation corresponding to each element in the phoneme sequence output by the encoder; input a characteristic representation corresponding to each element, a hidden state of the decoder output at the current moment by a first recurrent layer in the decoder, and a cumulative information of an attention weight corresponding to each element at a previous moment into the attention model, to obtain a context vector; input a hidden state of the decoder output at the current moment by a first recurrent layer of the decoder and the context vector into a second recurrent layer of the decoder, to obtain a hidden state of the decoder output at the current moment by the second recurrent layer of the decoder; and predict the acoustic characteristic parameter according to a hidden state of the decoder at each moment output by the decoder.

According to some embodiments, the phoneme conversion module is configured to perform text normalization to each of the segments respectively according to the language category to which each of the segments belongs; perform word group division on each normalized segment according to the language category to which each of the segments belongs; and convert a divided word group of each of the segments into a corresponding phoneme according to a preset phoneme conversion table of the language category to which each of the segments belongs; wherein the phoneme comprises a tone of a character.

According to still other embodiments of the present disclosure, a speech synthesis device is provided. The device comprises: a memory; and a processor coupled to the memory, wherein the processor is configured to implement the speech synthesis method according to any of the foregoing embodiments based on instructions stored in the memory.

According to yet other embodiments of the present disclosure, a computer readable storage medium is provided. The computer readable storage medium has stored thereon a computer program which, when executed by a processor, implements the steps of the method according to any of the foregoing embodiments.

In the present disclosure, the language category in the text is first identified such that the text is divided into a plurality of segments belonging to different language categories. According to a language category to which each of the segments belongs, each segment is converted into a corresponding phoneme respectively. The phoneme sequence of the text is input into a speech synthesis model and converted into the vocoder characteristic parameter, such that the vocoder outputs a speech based on the vocoder characteristic parameter. The solution of the present disclosure implements an end-to-end speech synthesis system that supports multilingual pronunciation. Moreover, compared to direct conversion into the vocoder characteristic parameter according to a character sequence, by way of conversion into the vocoder characteristic parameter according to the phoneme sequence, it is possible to allow a more accurate, smooth and natural synthesized speech.

Other characteristics and advantages of the present disclosure will become apparent from the following detailed description of exemplary embodiments of the present disclosure with reference to the accompanying drawings.

BRIEF DESCRIPTION OF THE DRAWINGS

The accompanying drawings described here which are intended to provide a further understanding of the present disclosure, constitute a part of the present application. The illustrative embodiments of the present disclosure as well as the illustrations thereof, which are intended for explaining the present disclosure, do not constitute improper definitions on the present disclosure. In the accompanying drawings:

FIG. 3 shows a schematic flowchart of a speech synthesis method according to other embodiments of the present disclosure.

DETAILED DESCRIPTION

The technical solution in the embodiments of the present disclosure will be explicitly and completely described below in conjunction with the accompanying drawings in the embodiments of the present disclosure. Apparently, the embodiments described are merely some of the embodiments of the present disclosure, rather than all of the embodiments. The following descriptions of at least one exemplary embodiment which are in fact merely illustrative, shall by no means serve as any delimitation on the present disclosure as well as its application or use. On the basis of the embodiments of the present disclosure, all the other embodiments obtained by those skilled in the art on the premise that no inventive effort is involved shall fall into the protection scope of the present disclosure.

The present disclosure provides a speech synthesis method, which will be described below in conjunction with FIG. 1.

Figure 1:
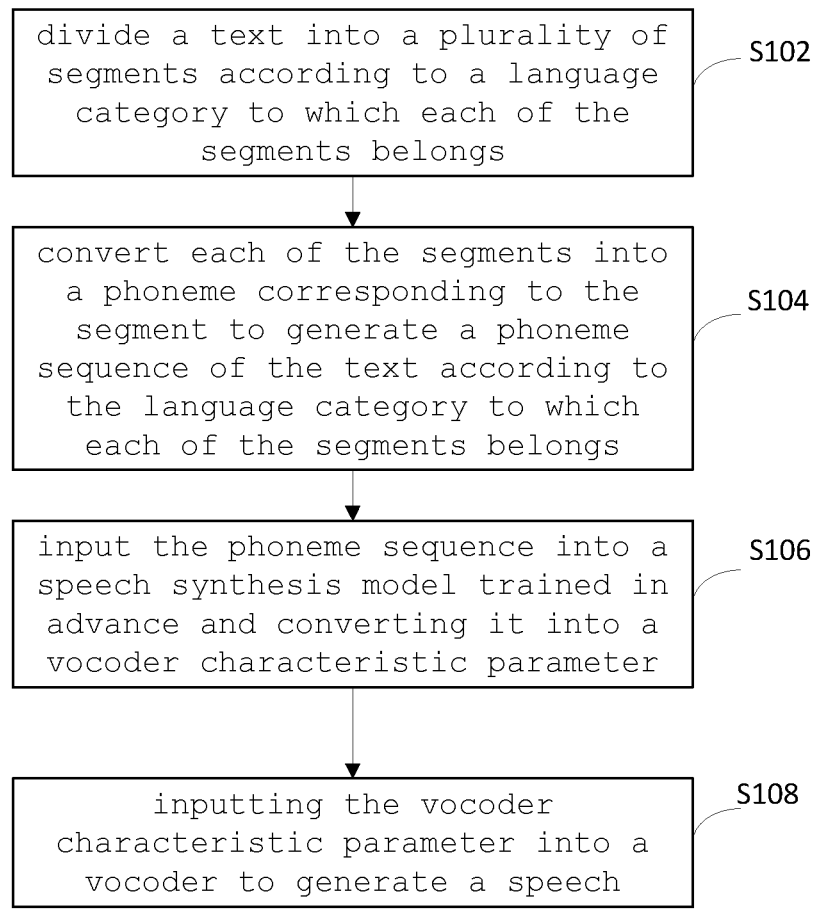
FIG. 1 shows a schematic flowchart of a speech synthesis method according to some embodiments of the present disclosure.

FIG. 1 shows a schematic flowchart of a speech synthesis method according to some embodiments of the present disclosure. As shown in FIG. 1, the method of this embodiment comprises: steps S102 to S108.

In step S102, the text is divided into a plurality of segments belonging to different language categories.

In some embodiments, the language category to which each character belongs is identified according to the encode of each character in the text; and consecutive characters belonging to same language are divided into one segment of the language. For example, in the case where the text contains Chinese and English characters, the Unicode code or other codes of the characters in the text may be obtained, and the Chinese characters and English characters in the text are recognized according to the Unicode code, such that the text are divided into a plurality of segments of different languages. If characters in other languages (for example, Japanese, French, etc.) are contained, they may be recognized according to a corresponding encoding form.

Next, taking the text containing Chinese and English as an example, a specific embodiment of dividing into a plurality of segments belonging to different language categories will be described. (1) Whether there are English characters in a sentence is determined according to the encode of the characters in the sentence. If not, (2) is performed; otherwise, (3) is performed. (2) The sentence is marked as a Chinese sentence. (3) Whether there are Chinese characters in the sentence is determined. If not, (4) is performed; otherwise, (7) is performed. (4) Whether the sentence contains only preset English characters is determined, wherein the preset English characters may include at least one kind of a unit of measurement, an abbreviation and an English serial number. If so, (5) is performed; otherwise, (6) is performed. (5) The sentence is marked as a Chinese sentence. (6) The sentence is marked as an English sentence. (7) The sentence is divided into Chinese segments and English segments.

In the above-described embodiments, in the case where the sentence contains only preset English characters, the sentence is marked as a Chinese sentence, so as to facilitate subsequently normalize the preset English characters according to Chinese. For example, such preset English characters as 12 km/h may be converted into <12千米每小时> during the subsequent normalization, and the sound made subsequently will be in Chinese pronunciation, which more conforms with the habits of Chinese users. Those skilled in the art may understand that, referring to the above-described embodiments, in the case where the sentence only contains some special international universal characters, the sentence may be marked as a preset language category based on the pronunciation requirements, so as to facilitate subsequent processing of text normalization and speech synthesis.

The above-described step (7) may include the following steps. (i) Whether the language category of a current character is the same as that of the previous character is determined. If so, (ii) is performed; otherwise, (iv) is performed. (ii) The current character is displaced into a current segment set. (iii) Whether the end of the sentence is reached is determined. If so, (iv) is performed; otherwise, (v) is performed. (iv) The character in the current segment set are marked with a language category and removed from the current segment set. (V) The next character is updated as the current character. Then, return to (i) to resume the same.

In step S104, each segment is converted into a phoneme corresponding to the segment respectively according to the language category to which each of the segments belongs, such that a phoneme sequence of the text is generated.

In some embodiments, each segment is normalized respectively according to the language category to which each of the segments belongs; each segment after normalization is divided into word groups respectively according to the language category to which each of the segments belongs; and the divided word group of each segment is converted into a corresponding phoneme according to a preset phoneme conversion table corresponding to the language category to which the segment belongs. The text usually contains a number of abnormal abbreviations, such as 12 km/s, 2019, etc. These abnormal texts have to be converted into normal texts which are suitable for speech synthesis by the speech synthesis system through a normalization operation. The segments belonging to different language categories are required to be normalized respectively. According to the special character contrast tables of different language categories, abnormal characters may be converted into normal characters. For example, 12 km/s is converted into <十二千米每秒>, to facilitate subsequent phoneme conversion.

Since different languages have different word group division methods, for example, English is divided into word groups according to words, while Chinese is required to be divided into word groups according to semantic information and the like. Therefore, each segment is divided into word groups respectively according to the language category to which each of the segments belongs. Each divided word group may be converted into a corresponding phoneme (G2P) by querying the preset phoneme conversion tables corresponding to different language categories. Some words that are not present in the preset phoneme conversion tables (OOV), such as misspelled words, newly created words, network words, etc., may be subjected to phoneme conversion through the existing technologies such as neural networks. The preset phoneme conversion tables may include phoneme correspondences of the polyphones, so as to perform accurate phoneme conversion for the polyphones. It is also possible to recognize the polyphones in other ways, or perform phoneme conversion through other existing technologies, which are not limited to the examples as listed.

In some embodiments, the phoneme may include tones of the characters, and taking tone as part of the phoneme may make a synthesized speech more accurate and natural. Some languages such as English and the like, do not have a tone, so that there is no need to add a corresponding tone mark in the phoneme sequence. In some embodiments, the text may also be divided into prosodic structures, for example identifying prosodic words and prosodic phrases of the text. According to a prosodic structure of the text, a prosodic identifier is added after the phoneme corresponding to each character in the text so as to form a phoneme sequence of the text. The prosodic identifier may be a special mark added after the phoneme of the prosodic word or the prosodic phrase to indicate a pause. The prediction of the prosodic structure may apply the existing technology, which will not be described in detail here.

In step S106, the phoneme sequence is input into a speech synthesis model trained in advance, and converted into the vocoder characteristic parameter.

According to the above-described embodiments, the phoneme sequence of the text may include a phoneme (including a tone) and a prosodic identifier of each character, and may also include some special symbols, such as a symbol <EOS> that indicates the end of the input phoneme sequence. The training process of the speech synthesis model will be described later.

In some embodiments, the speech synthesis model may include an acoustic parameter prediction model and a vocoder parameter conversion model. The acoustic parameters include, for example, speech frequency spectral parameters, such as Mel frequency spectral parameters or linear frequency spectral parameters. The parameters of the vocoder are determined according to the vocoder actually used. For example, if the vocoder is a world vocoder, the parameters of the vocoder may include fundamental frequency (F0), Mel-generalized cepstral (MGC), band a periodical (BAP), and the like. The phoneme sequence input into the acoustic parameter prediction model of the speech synthesis model may be converted into acoustic characteristic parameters; by inputting the acoustic characteristic parameters into the vocoder parameter conversion model in the speech synthesis model, an output of the vocoder characteristic parameters may be obtained.

The acoustic characteristic parameter prediction model which applies the Encoder-Decoder network structure, includes: an encoder, a decoder and an attention model. The input phoneme sequence and the output acoustic characteristic parameter sequence may not match with each other in length, and normally the acoustic characteristic parameter sequence may be relatively long. The neural network structure based on Encoder-Decoder may perform flexible characteristic prediction, so as to conform with the characteristics of speech synthesis. The encoder may include three-layers of one-dimensional convolution, and a bi-directional LSTM (Long Short-Term Memory) coding. In the three-layers of one-dimensional convolution, it is possible to learn the local context information of each phoneme, and in the bi-directional LSTM coding, the bi-directional global information of each phoneme is obtained by calculation. The encoder module can obtain a very expressive characteristic representation of the input phoneme containing the contextual information through the three-layers of one-dimensional convolution and the bi-directional LSTM encoding.

The decoder contains, for example, two fully connected layers and two LSTMs. The two fully connected layers may use Dropout technology to prevent the occurrence of an over-fitting phenomenon of the neural network. The attention model makes that the decoder to learn which input phonemes' internal representation should be focused the attention on at the current decoding moment during the decoding process. By means of the attention mechanism, the decoder may also learn the input phonemes for which parameter prediction has been completed, and the phonemes to which special attention is required to be paid at the current moment. The attention model obtains the context vector of the encoder, and during the decoding process, in conjunction with this context vector, it is possible to better predict the acoustic parameters required to be obtained at the current moment and determine whether to end the decoding process.

In some embodiments, the following steps may be performed in the acoustic characteristic parameter prediction model. The phoneme sequence is input to the encoder, so as to obtain the characteristic representation corresponding to each element of the output phoneme sequence of the encoder. The characteristic representation corresponding to each element, the hidden state of the decoder output at the current moment of the first recurrent layer (for example, a first LSTM) in the decoder, and the cumulative information of the attention weight corresponding to each element at the previous moment are input into the attention model so as to obtain the context vector. The hidden state of the decoder output at the current moment of the first recurrent layer of the decoder and the context vector are input into the second recurrent layer of the decoder, so as to obtain the hidden state of the decoder at the current moment output by the second recurrent layer of the decoder; the acoustic characteristic parameters are predicted based on the hidden state of the decoder at each moment output by the decoder. For example, the hidden state sequence of the decoder is linearly transformed to obtain the acoustic.

For example, the input phoneme sequence is $X=[x_1, x_2, \ldots, x_j, \ldots x_M]$, and the characteristic representation sequence output by the encoder is $H=[h_1, h_2, \ldots, h_j, \ldots, h_M]$, wherein j represents the position of each element in the input phoneme sequence, and M represents the total number of elements in the phoneme sequence. The hidden state sequence output by the decoder is $S=[s_1, s_2, \ldots, s_i, \ldots ]$, wherein i represents the time step output by the decoder. The prosodic identifier of the phoneme sequence may also be converted into a corresponding hidden state, and then converted into a hidden state of the decoder.

For example, the context vector may be calculated by using the following formula.

$$e_{i,j} = v^T \tan h(Ws_i + Vh_j + Uf_{i,j} + b) \quad (1)$$

$$f_i = F * \alpha_{i-1} \quad (2)$$

$$\beta_i = \text{softmax}(e_i) \quad (3)$$

$$c_i = \Sigma_{j=0}^{M} \beta_{i,j} * h_j \quad (4)$$

Wherein, i represents the time step of the decoder, j represents the position of the element in the phoneme sequence corresponding to the encoder, and i and j are positive integers. v, W, V, U, b are the parameters learned during the model training, and $s_i$ represents the hidden state of the decode output at the current i-th moment of the first recurrent layer (for example, the first LSTM) in the decoder. $h_j$ represents the characteristic representation corresponding to the j-th element, $f_{i,j}$ is the vector in $f_i$, and F is the convolution kernel with a preset length, $\alpha_{i-1}$ is the cumulative attention weight information (Alignments) corresponding to each element at the i−1th moment, $e_{i,j}$ is a value, $e_i$ is a constituent vector corresponding to each element, $\beta_i$ is a vector, $\beta_{i,j}$ r represents a value in $\beta_i$, $c_i$ is the corresponding context vector at the i-th moment, and M represents the total number of elements in the phoneme sequence.

In some embodiments, the attention model is used to determine the attention weight of each characteristic representation output by the encoder at the current moment. Determining whether the attention weight of the characteristic representation corresponding to the preset element in the phoneme sequence is a maximum value of attention weights (i.e., the attention weights of all the elements in the input phoneme sequence). If so, the decoding process is ended. The attention weight of the characteristic representation is generated by the attention model. For example, the preset element is the last <EOS> symbol in the phoneme sequence.

In the above-described method of determining whether to stop decoding, it is possible to make the decoder end decoding according to actual needs. Whether it is necessary to end the decoding process is determined based on the learned Alignments information. If the attention model has shifted its attention to the last symbol during the decoding, but the decoding process is not ended by a correct prediction, the system may forcedly end the decoding process based on the Alignments information. In the above-described auxiliary decoding ending algorithm, it is possible to favorably solve the problem that the model fails to predict the ending of the decoding process or incorrectly predicts the ending, so that avoiding the condition that the acoustic parameter prediction model continue to predict the acoustic characteristics of several frames and finally synthesize some incomprehensible speech, thus the accuracy, fluency and naturalness in speech output of the system is improved.

After the acoustic characteristic parameters of the input phoneme sequence are obtained by prediction, the acoustic characteristic parameters (for example, Mel spectrum parameters) are input into the vocoder parameter conversion model to be converted into the vocoder characteristic parameter, and then speech synthesis may be performed by the vocoder.

Figure 2:
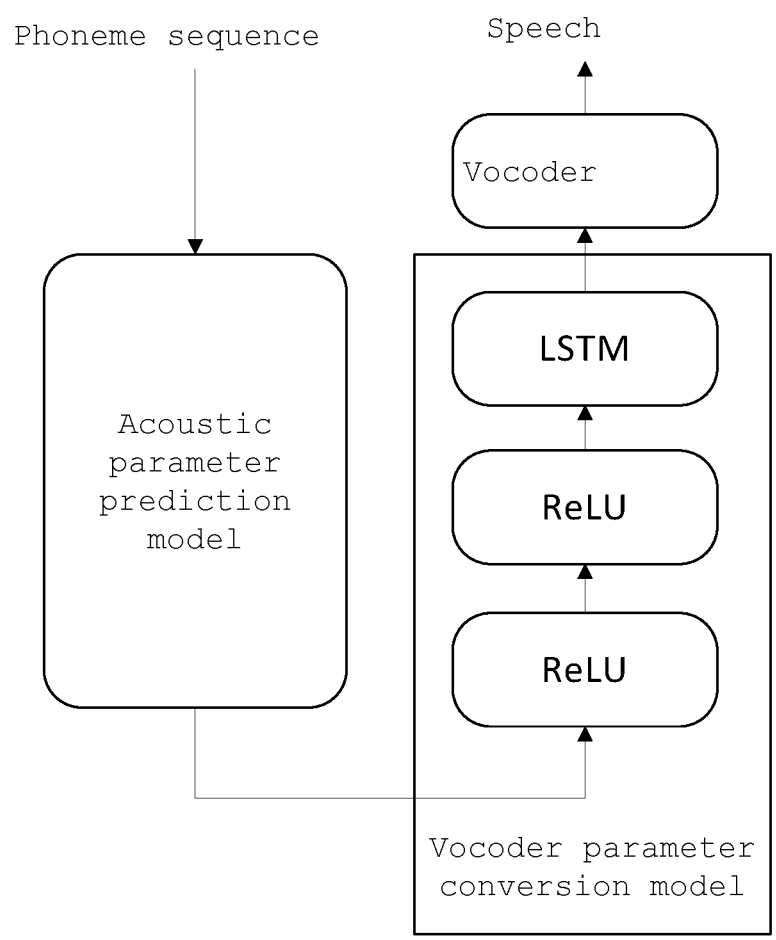
FIG. 2 shows a schematic structural view of a speech synthesis model according to some embodiments of the present disclosure.

The vocoder parameter conversion model may be the neural network structure of the DNN-LSTM (Deep Neural Network-Long Short-Term Memory Network). The network structure may include a multi-layer deep neural network and a long-and-short-term memory network. For example, as shown in FIG. 2, the network structure includes two layers of ReLU (activation function) connection and one layer of LSTM. The acoustic characteristic parameters are first input into the DNN network (for example, ReLU), so that it is possible to learn the nonlinear transformation of the acoustic characteristics and learn the internal characteristic representation of the neural network, which is equivalent to a characteristic learning process. The characteristics output by the DNN network are input to the LSTM to learn the historical dependence information of the acoustic characteristic parameters, in order to obtain a more smooth characteristic conversion. The inventors have found by test that, there is a better conversion effect of the parameters of the vocoder when the network structure includes two layers of ReLU connections and one layer of LSTM.

In some embodiments, in the case where the frequency of the acoustic characteristic parameter is lower than that of the vocoder characteristic parameter, making the frequency of the acoustic characteristic parameter equal to that of the vocoder characteristic parameter by up-sampling the acoustic characteristic parameter repeatedly. For example, the acoustic parameter prediction model performs parameter prediction with a frame of 15 ms, but the vocoder usually performs speech synthesis with a frame of 5 ms, so that there is a problem of mismatch in time frequency. In order to solve the problem of inconsistent in frequencies of the two models, it is necessary to perform up-sampling on the output of the acoustic parameter prediction model, so as to match the frequency of the vocoder model. Up-sampling may be performed on the output of the acoustic parameter prediction model repeatedly. For example, the acoustic characteristic parameter is overlapped for three times, and for the 1*80-dimensional Mel spectrum parameter, a 3*80-dimensional Mel spectrum parameter may be obtained by repeating for three times. The inventors have determined by test that, comparing with learning an up-sampling neural network or performing up-sampling by way of a difference, up-sampling by directly repeating the characteristics can achieve a favorable effect.

In step S108, the vocoder characteristic parameter is input to the vocoder to generate a speech.

The vocoder parameter conversion model in the above-described embodiments may be combined with the world vocoder. Comparing with the wavenet (whose network structure is complex so that a speech cannot be generated online in real time) in the prior art, it is possible to accelerate the calculation and implement that a speech is generated in real time by a simple network architecture, thereby reducing acoustic duplication and improving the speech synthesis effect relative to the Griffin-lim model in the prior art.

In the method of the foregoing embodiment, the language category in the text is first identified, such that the text is divided into a plurality of segments belonging to different language categories. According to a language category to which each of the segments belongs, each segment is converted into a corresponding phoneme. The phoneme sequence of the text is input into the speech synthesis model and converted into the vocoder characteristic parameter, and the vocoder outputs a speech based on the vocoder characteristic parameter. The solution of the above-described embodiments implements an end-to-end speech synthesis system that supports multilingual pronunciation, and as compared with direct conversion into the vocoder characteristic parameter according to the character sequence, by conversion into the vocoder characteristic parameter according to the phoneme sequence, it is possible allow a more accurate, smooth and natural speech synthesis. Further, the phoneme sequence is generated by adding prosodic structures, tones and the like, so that it is possible to further improve the speech synthesis effect. By means of the new vocoder characteristic parameter conversion model, it is possible to accelerate the calculation so as to implement that a speech is generated in real time, thereby reducing the acoustic duplication and further improving the speech synthesis effect. In addition, the above-described embodiments also provide a method to end the decoding process, which may solve the problem that the model fails to predict the ending of the decoding process or incorrectly predicts the ending, thereby avoiding that the acoustic parameter prediction model finally synthesizes some incomprehensible speeches, and further improving the accuracy, fluency and naturalness in speech output of the system.

In some embodiments, the method of training a speech synthesis model includes: converting a speech sample corresponding to each training text into a vocoder characteristic parameter sample based on the synthesis frequency of the vocoder; inputting each training text into the speech synthesis model to be trained to obtain the vocoder characteristic parameters output by the speech synthesis model; comparing the vocoder characteristic parameters with the corresponding vocoder characteristic parameter sample, and adjusting the parameters of the speech synthesis model to be trained based on the comparison results, until the training is completed.

In order to further improve the accuracy of the vocoder parameter conversion model, the training method of the speech synthesis model according to some embodiments of the present disclosure will be described below in conjunction with FIG. 3.

FIG. 3 shows a schematic flowchart of a speech synthesis method according to other embodiments of the present disclosure. As shown in FIG. 3, the method of this embodiment comprises: steps S302 to S310.

In step S302, the speech samples corresponding to each training text are divided into different frames according to a preset frequency, and the acoustic characteristic parameters are extracted for each frame, so as to respectively generate first acoustic characteristic parameter samples corresponding to each training text.

For example, each speech sample may be divided with a frequency of 15 ms to form frames, and the acoustic characteristic parameters of each frame of samples may be extracted to generate a first acoustic characteristic parameter sample (for example, a Mel spectrum parameter).

In step S304, the acoustic parameter prediction model is trained by using the first acoustic characteristic parameter sample corresponding to each training text and each training text.

First of all, for each training text, the training text may be divided into segments of different language categories, and each segment is converted into a corresponding phoneme respectively according to the language category to which each of the segments belongs, and a phoneme sequence of the training text is generated. The phoneme sequence may include a tone, a prosodic identifier, and the like. The phoneme sequence of each training text is input into the acoustic parameter prediction model, so as to obtain the output acoustic characteristic parameters corresponding to each training text. The output acoustic characteristic parameters corresponding to the same training text are compared with the first acoustic characteristic parameter sample, and the parameters in the acoustic parameter prediction model are adjusted based on the comparison results until a first preset target is satisfied, thereby completing the training of the acoustic parameter prediction model.

In step S306, each training text is converted into a second acoustic characteristic parameter sample respectively by using the trained acoustic parameter prediction model.

Each training text is input into the trained acoustic parameter prediction model, so that the second acoustic characteristic parameter sample corresponding to each training text is obtained.

In step S308, based on the synthesis frequency of the vocoder, the speech samples corresponding to each training text are respectively converted into the characteristic parameter samples of the vocoder.

For example, the speech samples may be divided at a frequency with 5 ms as a frame, and each frame of sample may be converted into a vocoder characteristic parameter sample (for example, MGC, BAP, log F0). The sequence of performing the step S308 is not limited, as long as it is prior to the step S310.

In step S310, the vocoder parameter conversion model is trained by using the second acoustic characteristic parameter sample and the vocoder characteristic parameter sample corresponding to each training text.

For example, each second acoustic characteristic parameter sample is input into the vocoder parameter conversion model to obtain the output vocoder characteristic parameter. The output vocoder characteristic parameter is compared with the corresponding vocoder characteristic parameter sample, and the parameters in the vocoder parameter conversion model are adjusted based on the comparison results until a second preset target is satisfied, thereby completing the training of the vocoder parameter conversion model.

In the method of the above-described embodiments, the vocoder parameter conversion model is trained by using the acoustic characteristic parameters obtained by prediction of the acoustic prediction model as the training data, so that it is possible to improve the accuracy of the vocoder parameter conversion model and allow a more accurate, smooth and natural synthesized speech. This is because, if the vocoder parameter conversion model is trained by using real acoustic characteristic parameters (for example, Mel spectrum parameters) extracted directly from a speech file, there will be a difference between the input characteristics of the model and the training characteristics of the model during actual speech synthesis. This is specifically because the input characteristic is the Mel spectrum obtained by prediction of the acoustic parameter prediction model during actual speech synthesis process. During the decoding process of the acoustic parameter prediction model, as the number of decoding steps increases, there may be more and more errors in the acoustic characteristic parameters obtained by prediction. However, in the acoustic parameter conversion module's training process, the real acoustic characteristic parameters of the sound file are used. The model obtained by training has not learned the acoustic characteristic parameters obtained by prediction and the acoustic characteristic parameters that have accumulated errors during the decoding process. Therefore, the input characteristic and the training characteristic not matching with each other may result in a serious degradation in the performance of the vocoder parameter conversion model.

The present disclosure also provides a speech synthesis device, which will be described below in conjunction with FIG. 4.

Figure 4:
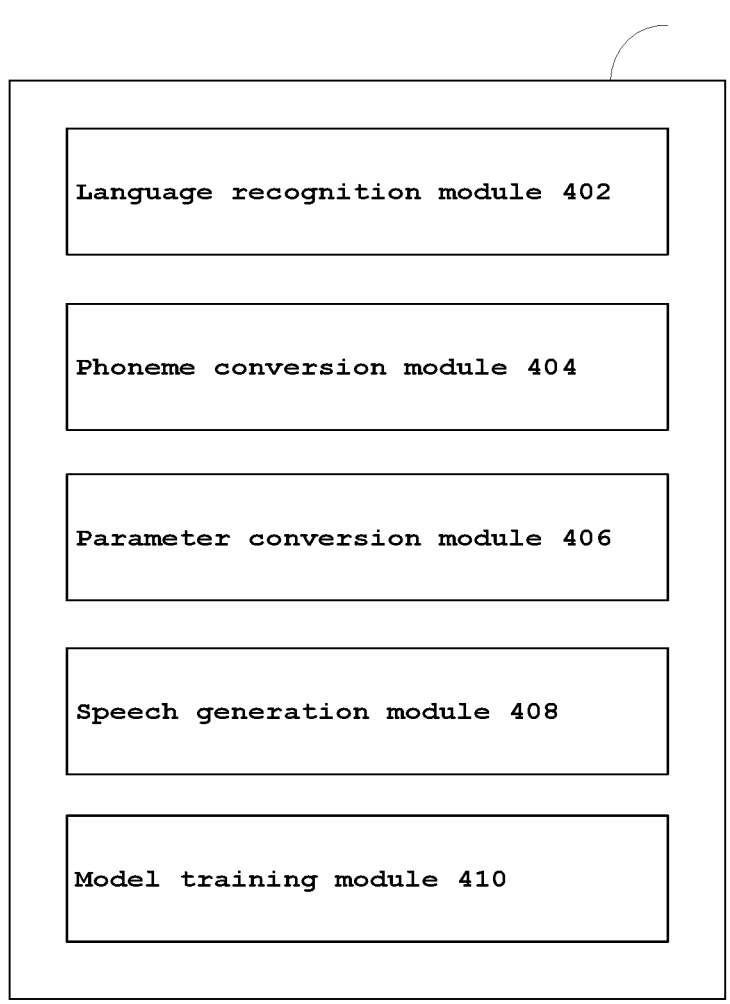
FIG. 4 shows a schematic structural view of a speech synthesis device according to some embodiments of the present disclosure.

FIG. 4 is a structural view of the speech synthesis device according to some embodiments of the present disclosure. As shown in FIG. 4, the device 40 of this embodiment includes: a language recognition module 402, a phoneme conversion module 404, a parameter conversion module 406, and a speech generation module 408.

The language recognition module 402 divides a text into a plurality of segments according to a language category to which each of the segments belongs.

In some embodiments, the language recognition module 402 is configured to recognize the language category to which each character belongs according to the encode of each character of the text, and divide consecutive characters belonging to same language into one segment of the language.

The phoneme conversion module 404 is configured to convert each of the segments into a phoneme corresponding to the segment to generate a phoneme sequence of the text according to the language category to which each of the segments belongs.

In some embodiments, the phoneme conversion module 404 is configured to determine a prosodic structure of the text, and add a prosodic identifier after the phoneme corresponding to each character of the text according to the prosodic structure of the text, to form the phoneme sequence of the text.

In some embodiments, the phoneme conversion module 404 is configured to perform text normalization to each of the segments respectively according to the language category to which each of the segments belongs; perform word group division on each normalized segment according to the language category to which each of the segments belongs; and convert a divided word group of each of the segments into a corresponding phoneme according to a preset phoneme conversion table of the language category to which each of the segments belongs; wherein the phoneme includes a tone of a character.

The parameter conversion module 406 is configured to input the phoneme sequence into the speech synthesis model trained in advance and convert it into the vocoder characteristic parameter.

In some embodiments, the parameter conversion module 406 is configured to input the phoneme sequence into an acoustic parameter prediction model of the speech synthesis model, to convert it into an acoustic characteristic parameter, and input the acoustic characteristic parameter into a vocoder parameter conversion model of the speech synthesis model to obtain the vocoder characteristic parameter.

In some embodiments, the acoustic parameter prediction model includes: an encoder, a decoder, and an attention model; the parameter conversion module 406 is configured to determine an attention weight of each characteristic representation output by the encoder at a current moment by using the attention model, and determine whether the attention weight of a characteristic representation corresponding to a preset element in the phoneme sequence is a maximum value among attention weights, and if so, ending the decoding process.

In some embodiments, the acoustic characteristic parameters include speech frequency spectrum parameters; the vocoder parameter conversion model is composed of a multi-layer deep neural network and a long-and-short-term memory network.

In some embodiments, in the case that a frequency of the acoustic characteristic parameter is less than that of the vocoder characteristic parameter, making the frequency of the acoustic characteristic parameter equal to that of the vocoder characteristic parameter by up-sampling the acoustic characteristic parameter repeatedly.

In some embodiments, the parameter conversion module 406 is configured to input the phoneme sequence to the encoder, and obtaining a characteristic representation corresponding to each element in the phoneme sequence output by the encoder; input a characteristic representation corresponding to each element, a hidden state of the decoder output at the current moment by a first recurrent layer in the decoder, and a cumulative information of an attention weight corresponding to each element at a previous moment into the attention model, to obtain a context vector; input a hidden state of the decoder output at the current moment by a first recurrent layer of the decoder and the context vector into a second recurrent layer of the decoder, to obtain a hidden state of the decoder output at the current moment by the second recurrent layer of the decoder; and predict the acoustic characteristic parameter according to a hidden state of the decoder at each moment output by the decoder.

The speech generating module 408 is configured to input the vocoder characteristic parameter into the vocoder to generate a speech.

In some embodiments, as shown in FIG. 4, the speech synthesis device 40 further includes: a model training module 410 configured to divide a speech sample corresponding to each of training texts into different frames according to a preset frequency, extracting an acoustic characteristic parameter for each frame, and generating a first acoustic characteristic parameter sample corresponding to each of the training texts respectively; train the acoustic parameter prediction model by using the first acoustic characteristic parameter sample corresponding to each of the training texts and each of the training texts; convert each of the training texts into a second acoustic characteristic parameter sample respectively by using a trained acoustic parameter prediction model; convert a speech sample corresponding to each of the training texts into a vocoder characteristic parameter sample respectively according to a synthesis frequency of the vocoder; and train a vocoder parameter conversion model by using the second acoustic characteristic parameter sample corresponding to each of the training texts and the vocoder characteristic parameter sample.

The speech synthesis device in the embodiments of the present disclosure may be implemented by various computing devices or computer systems, which will be described below in conjunction with FIGS. 5 and 6.

Figure 5:
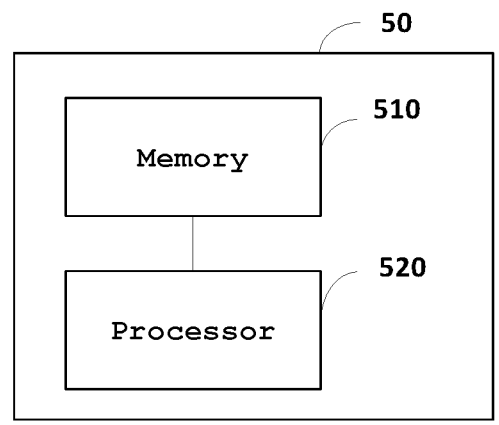
FIG. 5 shows a schematic structural view of a speech synthesis device according to other embodiments of the present disclosure.

FIG. 5 is a structural view of the speech synthesis device according to some embodiments of the present disclosure. As shown in FIG. 5, the device 50 of this embodiment includes: a memory 510 and a processor 520 coupled to the memory 510, wherein the processor 520 is configured to implement the speech synthesis method in any embodiments of the present disclosure based on instructions stored in the memory 510.

Wherein, the memory 510 may include, for example, a system memory, a fixed non-volatile storage medium, and the like. The system memory stores, for example, an operating system, an application program, a boot loader, a database, and other programs.

Figure 6:
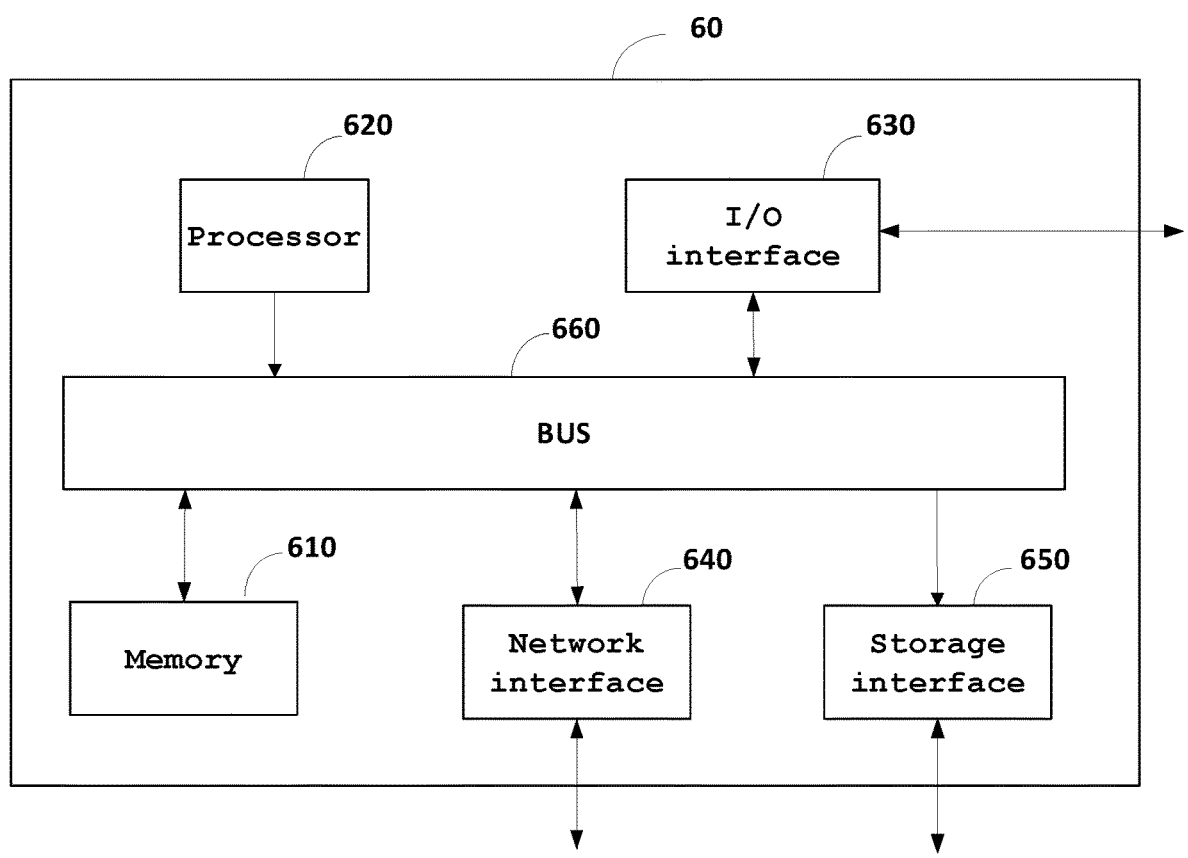
FIG. 6 shows a schematic structural view of a speech synthesis device according to still other embodiments of the present disclosure.

FIG. 6 is a structural view of the speech synthesis device according to other embodiments of the present disclosure. As shown in FIG. 6, the device 60 of this embodiment includes a memory 610 and a processor 620, which are similar to the memory 510 and the processor 520 respectively. There may further comprise an I/O interface 630, a network interface 640, a storage interface 650, and the like. These interfaces 630, 640, 650 as well as the memory 610 and the processor 620 therebetween may be connected, for example, via a bus 660. Wherein, the I/O interface 630 provides a connection interface for input and output devices such as a display, a mouse, a keyboard, and a touch screen. The network interface 640 provides a connection interface for various networked devices. For example, it may be connected to a database server or a cloud storage server. The storage interface 650 provides a connection interface for an external storage device such as an SD card or a USB flash disk.

Those skilled in the art will appreciate that the embodiments of the present disclosure may be provided as a method, system, or computer program product. Accordingly, the present disclosure may take the form of an entirely hardware embodiment, an entirely software embodiment, or a combination of software and hardware aspects. Moreover, the present disclosure may take the form of a computer program product embodied in one or more computer-usable non-transitory storage media (including but not limited to disk memory, CD-ROM, optical memory, and the like) containing computer usable program codes therein.

The present disclosure is described with reference to the flow charts and/or block views of methods, devices (systems), and computer program products according to the embodiments of the present disclosure. It will be understood that each step and/or block of the flowcharts and/or block views as well as a combination of steps and/or blocks of the flow charts and/or block views may be implemented by a computer program instruction. These computer program instructions may be provided to a processor of a general purpose computer, special purpose computer, an embedded processing machine, or other programmable data processing devices to produce a machine, such that the instructions executed by a processor of a computer or other programmable data processing devices produce a device for realizing a function designated in one or more steps of a flow chart and/or one or more blocks in a block view.

These computer program instructions may also be stored in a computer readable memory that may guide a computer or other programmable data processing device to operate in a particular manner, such that the instructions stored in the computer readable memory produce a manufacture including an instruction device. The instruction device realizes a function designated in one or more steps in a flow chart or one or more blocks in a block view.

These computer program instructions may also be loaded onto a computer or other programmable data processing devices, such that a series of operational steps are performed on a computer or other programmable device to produce a computer-implemented processing, such that the instructions executed on a computer or other programmable devices provide steps for realizing a function designated in one or more steps of the flow chart and/or one or more blocks in the block view.

The foregoing descriptions are only the preferred embodiments of the present disclosure, but do not serve to limit the present disclosure. Any amendment, equivalent replacement, improvement, and the like made within the spirit and principles of the present disclosure should all be contained within the protection scope of the present disclosure.

What is claimed is:

1. A speech synthesis method, comprising:
dividing a text into a plurality of segments according to a language category to which each of the segments belongs;
converting each of the segments into a phoneme corresponding to a segment to generate a phoneme sequence of the text, according to the language category to which each of the segments belongs, wherein, in a case where a sentence of the text contains only preset English characters, the language category of the sentence is determined according to pronunciation requirements, wherein the preset English characters consist of at least one kind of a unit of measurement, an abbreviation or an English serial number;
inputting the phoneme sequence into a speech synthesis model trained in advance and converting the phoneme sequence into a vocoder characteristic parameter; and
inputting the vocoder characteristic parameter into a vocoder to generate a speech.

2. The speech synthesis method according to claim 1, wherein dividing the text into a plurality of segments according to the language category to which each of the segments belongs comprises:
recognizing the language category to which each character belongs according to an encode of each character of the text; and
dividing consecutive characters belonging to same language into one segment of the language.

3. The speech synthesis method according to claim 1, wherein generating a phoneme sequence of the text comprises:
determining a prosodic structure of the text; and
adding a prosodic identifier after the phoneme corresponding to each character of the text according to the prosodic structure of the text, to form the phoneme sequence of the text.

4. The speech synthesis method according to claim 1, wherein inputting the phoneme sequence into the speech synthesis model trained in advance and converting the phoneme sequence into the vocoder characteristic parameter comprises:

inputting the phoneme sequence into an acoustic parameter prediction model of the speech synthesis model, to convert the phoneme sequence into an acoustic characteristic parameter; and inputting the acoustic characteristic parameter into a vocoder parameter conversion model of the speech synthesis model, to obtain the vocoder characteristic parameter.

5. The speech synthesis method according to claim 4, wherein, the acoustic parameter prediction model comprises: an encoder, a decoder, and an attention model, and the inputting the phoneme sequence into the acoustic parameter prediction model of the speech synthesis model, to convert the phoneme sequence into the acoustic characteristic parameter comprises:

determining an attention weight of each characteristic representation output by the encoder at a current moment by using the attention model; and determining whether the attention weight of a characteristic representation corresponding to a preset element in the phoneme sequence is a maximum value among attention weights, and if so, ending a decoding process of the decoder.

6. The speech synthesis method according to claim 4, wherein, the acoustic characteristic parameter comprises a speech frequency spectrum parameter; and the vocoder parameter conversion model comprises a multi-layer deep neural network and a long-and-short-term memory network.

7. The speech synthesis method according to claim 4, wherein, in the case that a frequency of the acoustic characteristic parameter is less than that of the vocoder characteristic parameter, making the frequency of the acoustic characteristic parameter equal to that of the vocoder characteristic parameter by up-sampling the acoustic characteristic parameter repeatedly.

8. The speech synthesis method according to claim 1, further comprising: training the speech synthesis model, wherein a training method comprises:

dividing a speech sample corresponding to each of training texts into different frames according to a preset frequency, extracting an acoustic characteristic parameter for each frame, and generating a first acoustic characteristic parameter sample corresponding to each of the training texts respectively;

training the acoustic parameter prediction model by using the first acoustic characteristic parameter sample corresponding to each of the training texts and each of the training texts;

converting each of the training texts into a second acoustic characteristic parameter sample respectively by using a trained acoustic parameter prediction model;

converting a speech sample corresponding to each of the training texts into a vocoder characteristic parameter sample respectively according to a synthesis frequency of the vocoder; and training a vocoder parameter conversion model by using the second acoustic characteristic parameter sample corresponding to each of the training texts and the vocoder characteristic parameter sample.

9. The speech synthesis method according to claim 4, wherein, the acoustic parameter prediction model comprises: an encoder, a decoder, and an attention model, and the inputting the phoneme sequence into the acoustic parameter prediction model of the speech synthesis model, to convert the phoneme sequence into the acoustic characteristic parameter comprises:

inputting the phoneme sequence to the encoder, and obtaining a characteristic representation corresponding to each element in the phoneme sequence output by the encoder;

inputting a characteristic representation corresponding to each element, a hidden state of the decoder output at a current moment by a first recurrent layer in the decoder, and a cumulative information of an attention weight corresponding to each element at a previous moment into the attention model, to obtain a context vector;

inputting a hidden state of the decoder output at the current moment by a first recurrent layer of the decoder and the context vector into a second recurrent layer of the decoder, to obtain a hidden state of the decoder output at the current moment by the second recurrent layer of the decoder; and predicting the acoustic characteristic parameter according to a hidden state of the decoder at each moment output by the decoder.

10. The speech synthesis method according to claim 1, wherein converting each of the segments into the corresponding phoneme respectively according to the language category to which each of the segments belongs comprises:

performing text normalization to each of the segments respectively according to the language category to which each of the segments belongs;

performing word group division on each normalized segment according to the language category to which each of the segments belongs; and converting a divided word group of each of the segments into a corresponding phoneme according to a preset phoneme conversion table of the language category to which each of the segments belongs;

wherein the phoneme comprises a tone of a character.

11. A speech synthesis device, comprising:

a memory; and a processor coupled to the memory, which, based on instructions stored in the memory, is configured to perform the method comprising:

dividing a text into a plurality of segments according to a language category to which each of the segments belongs, wherein, in a case where a sentence of the text contains only preset English characters, the language category of the sentence is determined according to pronunciation requirements, wherein the preset English characters consist of at least one kind of a unit of measurement, an abbreviation or an English serial number;

converting each of the segments into a phoneme corresponding to the segment to generate a phoneme sequence of the text according to the language category to which each of the segments belongs;

inputting the phoneme sequence into a speech synthesis model trained in advance and converting the phoneme sequence into a vocoder characteristic parameter; and inputting the vocoder characteristic parameter into a vocoder to generate a speech.

12. A non-transitory computer readable storage medium having stored thereon computer program instructions which, when executed by a processor, are configured to execute the steps of:

dividing a text into a plurality of segments according to a language category to which each of the segments belongs, wherein, in a case where a sentence of the text contains only preset English characters, the language category of the sentence is determined according to pronunciation requirements, wherein the preset English characters consist of at least one kind of a unit of measurement, an abbreviation or an English serial number;

converting each of the segments into a phoneme corresponding to the segment to generate a phoneme sequence of the text according to the language category to which each of the segments belongs;

inputting the phoneme sequence into a speech synthesis model trained in advance and converting the phoneme sequence into a vocoder characteristic parameter; and inputting the vocoder characteristic parameter into a vocoder to generate a speech.

13. The speech synthesis device according to claim 11, wherein, dividing the text into a plurality of segments according to the language category to which each of the segments belongs comprises:

recognizing the language category to which each character belongs according to the encode of each character of the text; and dividing consecutive characters belonging to same language into one segment of the language.

14. The speech synthesis device according to claim 11, wherein generating a phoneme sequence of the text comprises:

determining a prosodic structure of the text; and adding a prosodic identifier after the phoneme corresponding to each character of the text according to the prosodic structure of the text, to form the phoneme sequence of the text.

15. The speech synthesis device according to claim 11, wherein inputting the phoneme sequence into the speech synthesis model trained in advance and converting the phoneme sequence into the vocoder characteristic parameter comprises:

inputting the phoneme sequence into an acoustic parameter prediction model of the speech synthesis model, to convert the phoneme sequence into an acoustic characteristic parameter; and inputting the acoustic characteristic parameter into a vocoder parameter conversion model of the speech synthesis model, to obtain the vocoder characteristic parameter.

16. The speech synthesis device according to claim 11, wherein the method further comprising: training the speech synthesis model, wherein a training method comprises:

dividing a speech sample corresponding to each of training texts into different frames according to a preset frequency, extracting an acoustic characteristic parameter for each frame, and generating a first acoustic characteristic parameter sample corresponding to each of the training texts respectively;

training the acoustic parameter prediction model by using the first acoustic characteristic parameter sample corresponding to each of the training texts and each of the training texts;

converting each of the training texts into a second acoustic characteristic parameter sample respectively by using a trained acoustic parameter prediction model;

converting a speech sample corresponding to each of the training texts into a vocoder characteristic parameter sample respectively according to a synthesis frequency of the vocoder; and training a vocoder parameter conversion model by using the second acoustic characteristic parameter sample corresponding to each of the training texts and the vocoder characteristic parameter sample.

17. The non-transitory computer readable storage medium according to claim 12, wherein, dividing the text into a plurality of segments according to the language category to which each of the segments belongs comprises:

recognizing the language category to which each character belongs according to the encode of each character of the text; and dividing consecutive characters belonging to same language into one segment of the language.

18. The non-transitory computer readable storage medium according to claim 12, wherein generating a phoneme sequence of the text comprises:

determining a prosodic structure of the text; and adding a prosodic identifier after the phoneme corresponding to each character of the text according to the prosodic structure of the text, to form the phoneme sequence of the text.

19. The non-transitory computer readable storage medium according to claim 12, wherein inputting the phoneme sequence into the speech synthesis model trained in advance and converting the phoneme sequence into the vocoder characteristic parameter comprises:

inputting the phoneme sequence into an acoustic parameter prediction model of the speech synthesis model, to convert the phoneme sequence into an acoustic characteristic parameter; and inputting the acoustic characteristic parameter into a vocoder parameter conversion model of the speech synthesis model, to obtain the vocoder characteristic parameter.

20. The non-transitory computer readable storage medium according to claim 12, wherein the method further comprising: training the speech synthesis model, and wherein a training method comprises:

dividing a speech sample corresponding to each of training texts into different frames according to a preset frequency, extracting an acoustic characteristic parameter for each frame, and generating a first acoustic characteristic parameter sample corresponding to each of the training texts respectively;

training the acoustic parameter prediction model by using the first acoustic characteristic parameter sample corresponding to each of the training texts and each of the training texts;

converting each of the training texts into a second acoustic characteristic parameter sample respectively by using a trained acoustic parameter prediction model;

converting a speech sample corresponding to each of the training texts into a vocoder characteristic parameter sample respectively according to a synthesis frequency of the vocoder; and training a vocoder parameter conversion model by using the second acoustic characteristic parameter sample corresponding to each of the training texts and the vocoder characteristic parameter sample.

* * * * *